(12) United States Patent
Coester et al.

(10) Patent No.: US 10,227,091 B2
(45) Date of Patent: Mar. 12, 2019

(54) ACCIDENT PREVENTION WITH FOLLOWING TRAFFIC DURING AN AUTOMATED PARKING PROCEDURE IN A TRANSVERSE PARKING SPACE

(71) Applicant: Bayerische Motoren Werke Aktiengesellschaft, Munich (DE)

(72) Inventors: Constantin Coester, Munich (DE); Izden Sarihan, Munich (DE); Thomas Goldmann, Bayreuth (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 138 days.

(21) Appl. No.: 15/482,111

(22) Filed: Apr. 7, 2017

(65) Prior Publication Data

US 2017/0210421 A1    Jul. 27, 2017

Related U.S. Application Data

(63) Continuation of application No. PCT/EP2015/073065, filed on Oct. 6, 2015.

(30) Foreign Application Priority Data

Oct. 7, 2014    (DE) .................. 10 2014 220 298

(51) Int. Cl.
  *B62D 15/02*    (2006.01)
(52) U.S. Cl.
  CPC ....... *B62D 15/0285* (2013.01); *B62D 15/028* (2013.01)
(58) Field of Classification Search
  CPC combination set(s) only.
  See application file for complete search history.

(56) References Cited

U.S. PATENT DOCUMENTS 9,035,760 B2 * 5/2015 Reilhac ............... B60Q 9/004
                                                                  180/271
9,208,686 B2 * 12/2015 Takamatsu ........... B60R 1/00
(Continued)

FOREIGN PATENT DOCUMENTS

DE    10 2010 041 902 A1    4/2012
DE    10 2010 056 064 A1    6/2012
(Continued)

OTHER PUBLICATIONS

"Parkassistent mit Längs- und Querführung", Dirk Ahrens, 5. Driver Assistance Conference of TU München, Munich, 2012, pp. 1-10, http://mediaturn.ub.turn.de/doc/1142099/1142099.pdf.

(Continued)

*Primary Examiner* — Redhwan K Mawari
(74) *Attorney, Agent, or Firm* — Crowell & Moring LLP

(57) ABSTRACT

A method is provided for accident prevention with the following traffic during an automated parking procedure of a motor vehicle having a parking assistance system with at least one automated transverse guide. In order to park, a first parking movement into the transverse parking space is provided in the backwards or forwards direction, and, if necessary, at least one subsequent correction movement in the forwards or backwards direction. A need for a correction movement in the forward or backward direction is determined according to the method. In response to the fact that a need for a correction movement is determined, the method prevents the vehicle from pulling so far into the transverse parking space during the parking movement so that afterwards, when beginning the correction movement in the forward or backward direction, the driver does not have an obstructed view of the following traffic due to the visual blocking by a vehicle adjacent to the transverse parking space.

20 Claims, 4 Drawing Sheets

(56) References Cited

U.S. PATENT DOCUMENTS

| | | | |
|---|---|---|---|
| 9,630,556 B2* | 4/2017 | Max | B60Q 9/006 |
| 9,834,143 B2* | 12/2017 | Zhang | B60R 1/00 |
| 2010/0253780 A1* | 10/2010 | Li | B60R 1/00 |
| | | | 348/148 |

FOREIGN PATENT DOCUMENTS

| | | |
|---|---|---|
| DE | 10 2011 084 943 A1 | 4/2013 |
| DE | 10 2011 086 245 A1 | 5/2013 |
| DE | 10 2011 122 421 A1 | 6/2013 |
| GB | 2484398 A | 4/2012 |

OTHER PUBLICATIONS

International Search Report (PCT/ISA/210) issued in PCT Application No. PCT/EP2015/073065 dated Feb. 15, 2016 with English-language translation (four (4) pages).

Japanese-language Written Opinion (PCT/ISA/237) issued in PCT Application No. PCT/EP2015/073065 dated Feb. 15, 2016 (seven (7) pages).

German Search Report issued in counterpart German Application No. 10 2014 220 298.1 dated Aug. 24, 2015 with partial English-language translation (twelve (12) pages).

* cited by examiner

ACCIDENT PREVENTION WITH FOLLOWING TRAFFIC DURING AN AUTOMATED PARKING PROCEDURE IN A TRANSVERSE PARKING SPACE

CROSS REFERENCE TO RELATED APPLICATIONS

This application is a continuation of PCT International Application No. PCT/EP2015/073065, filed Oct. 6, 2015, which claims priority under 35 U.S.C. § 119 from German Patent Application No. 10 2014 220 298.1, filed Oct. 7, 2014, the entire disclosures of which are herein expressly incorporated by reference.

BACKGROUND AND SUMMARY OF THE INVENTION

The invention relates to parking assistance systems having at least automatic lateral guidance for motor vehicles, particularly for automobiles.

In parking assistance systems with automatic lateral guidance, steering of the motor vehicle during the parking procedure is undertaken by the system. Longitudinal guidance needs to be undertaken by the driver himself by means of appropriate acceleration and braking. In parking assistance systems with automatic lateral guidance and automatic longitudinal guidance, the task of longitudinal guidance is also undertaken by the parking assistance system in part or in full depending on the degree of automation of the longitudinal guidance. In parking assistance systems with automatic lateral guidance and fully automatic longitudinal guidance, the steering, the brakes, the vehicle drive and the direction of travel (forward or reverse travel), for example, are controlled by the parking assistance system. In such parking assistance systems, the driver has the option, for example, of operating an operator control element, for example a key, in order to be able to have the vehicle parked and optionally removed from a parking space automatically.

An exemplary parking assistance system with automatic lateral guidance and fully automatic longitudinal guidance is described in the document "Parkassistent mit Längsund Querführung", Dirk Ahrens, 5. Driver Assistance Conference of TU München, Munich, 2012, which is available on the Internet under the link "http://mediatum.ub.tum.de/doc/1142099/1142099.pdf", for example.

Such parking assistance systems allow parking in parallel parking spaces and/or perpendicular parking spaces.

The invention relates to a parking assistance system having at least automatic lateral guidance for parking in perpendicular parking spaces.

By way of example, in order to park in perpendicular parking spaces, such parking assistance systems involve ultrasonic sensors being used when manually traveling past motor vehicles parked perpendicular to the road to automatically measure a perpendicular parking space between the vehicles parked in a perpendicular direction. Based on the measurement of the parking space, performance of the parking maneuver is preceded by a parking trajectory being planned, on which the vehicle parks in the parallel parking space in reverse with automatic lateral guidance and possibly automatic longitudinal guidance in one or more moves. If, during the trajectory planning, it is established that it is not possible to satisfy the criteria for an admissible parking end position in a single parking move in a reverse direction (for example in relation to the distance from the vehicles bounding the perpendicular parking space and in relation to the rotation between the vehicle orientation and the orientation of the parking space), then there is a need for a subsequent corrective move in a forward direction with a subsequent parking move in a reverse direction. Alternatively, multiple corrective moves in a forward direction with a respective subsequent parking move in a reverse direction may be necessary.

The corrective moves that may be necessary involve the vehicle being driven forward out of the perpendicular parking space again to a greater or lesser extent into the traffic area. Depending on the extent to which the vehicle has already entered the perpendicular parking space at the beginning of the corrective move, it can occur that the driver would no longer have a clear view of the following traffic in the traffic area at the beginning of the corrective move in a forward direction on account of the visual obstruction by a vehicle bounding the perpendicular parking space. In this case, the vehicle would travel into the traffic area without a view of the following traffic; in a parking assistance system with only automatic lateral guidance, the driver then receives from the system a request (typically by means of a display unit in the vehicle cockpit) to drive forward, and in a parking assistance system with automatic longitudinal guidance, this driving forward into the traffic area would even be effected fully automatically. Typically, such systems have no sensors for identifying in sufficient time following cross traffic traveling at speed in order to abort the corrective move in a forward direction in the event of a risk of collision with the following cross traffic. This is aggravated by the fact that the following traffic, particularly even cyclists, notice too late that a vehicle that has already entered the perpendicular parking space is pulling out.

Alternatively, similar parking assistance systems are naturally also possible in which the vehicle parks in the perpendicular parking space forward and any corrective moves are effected in a reverse direction rather than in a forward direction. The explanations above regarding reverse parking also apply mutatis mutandis to parking assistance systems for parking in perpendicular parking spaces in a forward direction.

It is an object of the invention to improve an automated parking procedure into a perpendicular parking space such that an accident with the following traffic is prevented.

This and other objects are achieved by a method for avoiding accidents with following traffic during an automated parking procedure in accordance with embodiments of the invention.

A first aspect of the invention relates to a method for avoiding accidents with the following traffic during an automated parking procedure for a motor vehicle having a parking assistance system with at least automatic lateral guidance. The parking assistance system can additionally comprise automatic longitudinal guidance with drive control and control of the direction of travel (forward or reverse direction). For parking, a parking move into the perpendicular parking space is effected in a reverse or forward direction, and, when required, subsequently at least one corrective move is effected in a forward or reverse direction.

The method involves determining that there is a need for a corrective move in a forward or reverse direction. This can be effected during the actual trajectory planning prior to the parking move in a reverse direction. To this end, it is possible to determine a trajectory of travel for the parking move with a particular parking end position at the end of the trajectory of travel of the parking move, for example. The parking end position is then rated in relation to one or more criteria for an admissible parking end position being satisfied, e.g. in relation to an admissible distance from the vehicles bounding the perpendicular parking space in the parking end position and in relation to the rotation between the vehicle orientation in the parking end position and the orientation of the parking space. This then involves determining a need for a corrective move by finding that a criterion necessary for an admissible parking end position is not satisfied and hence there is a need for a corrective move.

In response to a need for a corrective move being established, the vehicle is prevented, during the parking move, from entering the perpendicular parking space to such a depth that the driver would subsequently no longer have a clear view of the following traffic at the beginning of the corrective move in a forward or reverse direction on account of the visual obstruction by a vehicle bounding the perpendicular parking space. By way of example, it is possible to continually check whether the parking move in a reverse direction results in the perpendicular parking space being entered to an excessive depth when there is a need for at least one corrective move in a forward direction.

If, by contrast, it is established that there is no need for a corrective move, then the vehicle is parked in the parking space in the planned parking move in a forward direction or reverse direction up to the previously planned parking end position (either manually by virtue of appropriate instructions for manual longitudinal guidance to the driver or using automatic longitudinal guidance).

In order to prevent the vehicle from entering the perpendicular parking space to such a depth during the parking move that subsequently the driver would no longer have a clear view of the following traffic at the beginning of the corrective move in a forward or reverse direction on account of the visual obstruction by a vehicle bounding the perpendicular parking space, the parking move can be terminated at such an early stage, for example, and a change of direction can be triggered before the position of the driver crosses the line of sight (either manually by virtue of appropriate instructions for manual longitudinal guidance to the driver or using automatic longitudinal guidance). The line of sight is typically formed by the rear or front, facing the traffic area, of one or more vehicles bounding the perpendicular parking space.

The fact that the vehicle does not enter the perpendicular parking space to such a depth during the parking move also allows the following traffic to see the parking vehicle during almost the whole parking procedure up to shortly before the parking end position is reached; this prevents the vehicle from disappearing in the perpendicular parking space for a short time during the reverse parking move and then no longer being visible to the following traffic.

The parking move may be the first parking move in a reverse direction or a later parking move in a reverse direction (after a corrective move in a forward direction has already been performed beforehand), for example.

It is advantageous if—while the parking move is being effected—it is continually monitored to what depth the vehicle has already entered the parking space. During the monitoring, it is then established at one time or another that the vehicle has already entered the parking space to a particular first limit or beyond a particular first limit. In response to this finding, premature termination of the parking move and performance of a corrective move in a forward or reverse direction are caused. The premature termination of the parking move means that the planned trajectory of this parking move is not taken up to the planned end point of the parking move.

By way of example, the parking assistance system may be a parking assistance system having automatic lateral guidance, but without automatic longitudinal guidance for the purposes of automatic drive control and automatic control of direction-of-travel changes. The system triggering premature termination of the parking move and performance of a corrective move then comprises asking the driver to travel forward or to reverse, for example. The request can be made visually by means of a display unit in the vehicle cockpit, for example. To trigger premature termination of the parking move, for example, the display unit is used to output the notification "Please travel forward". The driver will then brake and subsequently, at a standstill, change the direction of travel (for example by moving the gear selector lever of an automatic gearbox from R to D or moving the gear selector lever of a manual gearbox from R to first gear).

Alternatively, a parking assistance system may have automatic lateral guidance and automatic longitudinal guidance (with automatic drive control and automatic control of direction-of-travel changes), for example. To prematurely terminate the parking move and perform a corrective move, the vehicle is automatically slowed to a standstill, the direction of travel is automatically changed (for example by shifting the automatic gearbox from reverse to forward) and the corrective move is automatically performed by virtue of appropriate control of the vehicle drive.

The first aspect of the invention prevents the vehicle from entering a parking space to an excessive depth and the driver from then not being able to see the traffic area during a subsequent corrective move. Furthermore, the vehicle therefore remains visible to the following traffic during the parking procedure up until shortly before the parking end position is reached.

By contrast, a second aspect of the invention relates to the case of the vehicle already having entered the parking space to an excessive depth. In this regard, during the parking maneuver (preferably during the parking move in a reverse or forward direction), the depth to which the vehicle has already entered the parking space is continually monitored. It is then established at some time or another that the vehicle has already entered the parking space to a particular second limit or beyond a particular second limit. This means that the vehicle has already entered the parking space to an excessive depth.

In response to this finding, a corrective move in a forward or reverse direction is prevented, even though there is actually a need for a corrective move (since the parking move cannot be used to reach a parking end position that is admissible in terms of the criteria described above).

As soon as a point of no return has been exceeded, for example, a corrective move in a forward direction out of the parking space is prevented. By way of example, the point of no return can correspond to a line of sight into the flowing traffic or to the line of sight plus a particular positive or negative offset (e.g. 20 cm or −20 cm).

In a parking assistance system with automatic longitudinal guidance, the prevention can involve no further corrective move out of the parking space being performed automatically during the parking maneuver.

In a parking assistance system without automatic longitudinal guidance, on the other hand, the prevention of the corrective move can involve preventing a request to the driver to travel forward or to reverse from being output. Furthermore, it is also possible for a warning notification to be output to the driver.

The first and second aspects of the invention can also be combined. In this case, a preferred embodiment of the invention provides for the second limit to be situated deeper in the parking space than the first limit (i.e. in the case of a parking move in a reverse or forward direction, the first limit can be reached before the second limit is reached).

It is subsequently assumed that the parking assistance system does not have automatic longitudinal guidance. According to the first aspect of the invention, in response to the finding that the vehicle has already entered the parking space to a particular first limit or beyond a particular first limit, the driver is asked to travel forward or to reverse (i.e. the parking move in reverse or forward is intended to be terminated prematurely). If the driver continues the parking move despite a request by the system, on the other hand, then the second aspect of the invention takes effect: that is to say that subsequently, in response to the finding that the vehicle has already entered the parking space to a particular second limit or beyond a particular second limit during the parking move, the request to the driver to travel forward or to reverse is withdrawn. By way of example, when the first limit is crossed, the request "Please travel forward" is output to the driver. If this request is ignored, then this request ceases again when the second limit is crossed. It would instead be possible for a request to reverse or travel forward to be output to the driver directly even when the second limit is crossed.

It would also be contemplated for, after the request to the driver to travel forward or to reverse is withdrawn in the event of the driver traveling in a forward direction or reverse direction, the parking assistance function (i.e. the automatic steering function thereof) to be aborted, for example when the second limit is reached or crossed in a forward direction or reverse direction. Optionally, it is then also possible for an error notification to be delivered to the driver.

The text above has indicated in relation to both aspects of the invention that the criterion that the vehicle has entered the parking space to a particular limit or beyond a particular limit is checked for satisfaction. In the case of the first aspect of the invention, the first limit is involved, and in the case of the second aspect of the invention, the second limit is involved. Satisfaction of this criterion is consistent, by way of example, with the situation when a reference point on the vehicle reaches or crosses a line of sight or crosses the line of sight with a particular (positive or negative) offset (e.g. +20 cm or −20 cm). In this case, the line of sight is preferably formed by the rear or front, facing the traffic area, of one or more vehicles bounding the perpendicular parking space. By way of example, the vehicle comprises a B pillar on each vehicle side, and the reference point is situated between the two B pillars. Thus, a check is then performed to determine whether this reference point between the two B pillars reaches or crosses the line of sight, possibly with a particular offset.

The invention also relates to a parking assistance system that is configured to avoid accidents with the following traffic in accordance with the first aspect of the invention. It is capable of finding that there is a need for a corrective move in a forward or reverse direction, and, in response thereto, preventing the vehicle from entering the perpendicular parking space to such a depth during the parking move that subsequently the driver would no longer have a clear view of the following traffic at the beginning of the corrective move in a forward or reverse direction on account of the visual obstruction by a vehicle bounding the perpendicular parking space.

The above explanations relating to the method according to the invention based on the first aspect of the invention also apply in a corresponding manner to the parking assistance system described above. Exemplary embodiments of the parking assistance system that are not described explicitly at this juncture correspond to the described exemplary embodiments of the method according to the invention based on the first aspect of the invention.

The invention also relates to a parking assistance system that is configured to avoid accidents with the following traffic in accordance with the second aspect of the invention. It is capable of monitoring to what depth the vehicle has entered the parking space, and of determining that the vehicle has already entered the parking space to a particular second limit or beyond a particular second limit. It is furthermore capable of responding to this finding by preventing a corrective move in a forward or reverse direction despite the need for a corrective move.

The explanations above relating to the method according to the invention based on the second aspect of the invention also apply in a corresponding manner to this parking assistance system. Exemplary embodiments of the parking assistance system that are not described explicitly at this juncture correspond to the described exemplary embodiments of the method according to the invention based on the second aspect of the invention.

A preferred exemplary embodiment of a parking assistance system according to the invention is configured to avoid accidents with the following traffic in accordance with the two aspects of the invention, as has been described in detail above for the two aspects.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
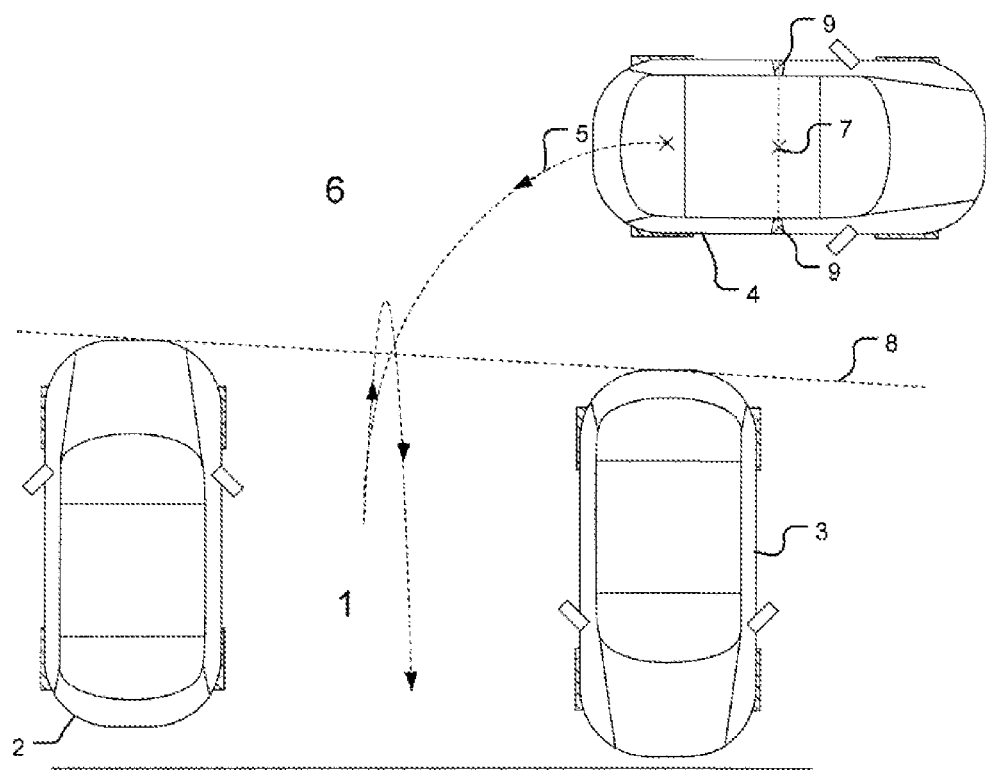
FIG. 1 is a schematic diagram of a parking situation before the beginning of the parking procedure.

FIG. 1 shows a parking situation into a perpendicular parking space 1 before the beginning of the parking procedure in the case of a parking assistance system with automatic lateral guidance (and without automatic longitudinal guidance).

On slowly traveling past the motor vehicles 2, 3 parked perpendicular to the road 6, ultrasonic sensors are used to automatically measure the perpendicular parking space 1 between the vehicles 2, 3 parked in a perpendicular direction.

After the ego motor vehicle 4 is stopped and reverse gear is engaged, the perpendicular parking space 1, provided that it is suitable for parking, is displayed to the driver on a display in the vehicle cockpit, and the driver can activate the parking procedure with automatic lateral guidance into the perpendicular parking space 1.

On the basis of the measurement of the parking space, performance of the parking maneuver is preceded by an attempt to compute a trajectory for the first parking move, on which trajectory the ego vehicle 4 is intended to park in the perpendicular parking space 1 in reverse with automatic lateral guidance in a single parking move (i.e. without changing the direction of travel).

For an assumed end position of the vehicle 4 at the end of the first parking move, the lateral distance from the vehicles 2, 3 bounding the parking space 1 is computed. Furthermore, for this end position of the first parking move, the rotation of the orientation of the ego vehicle 4 relative to the orientation of the perpendicular parking space 1 is determined.

Figure 2:
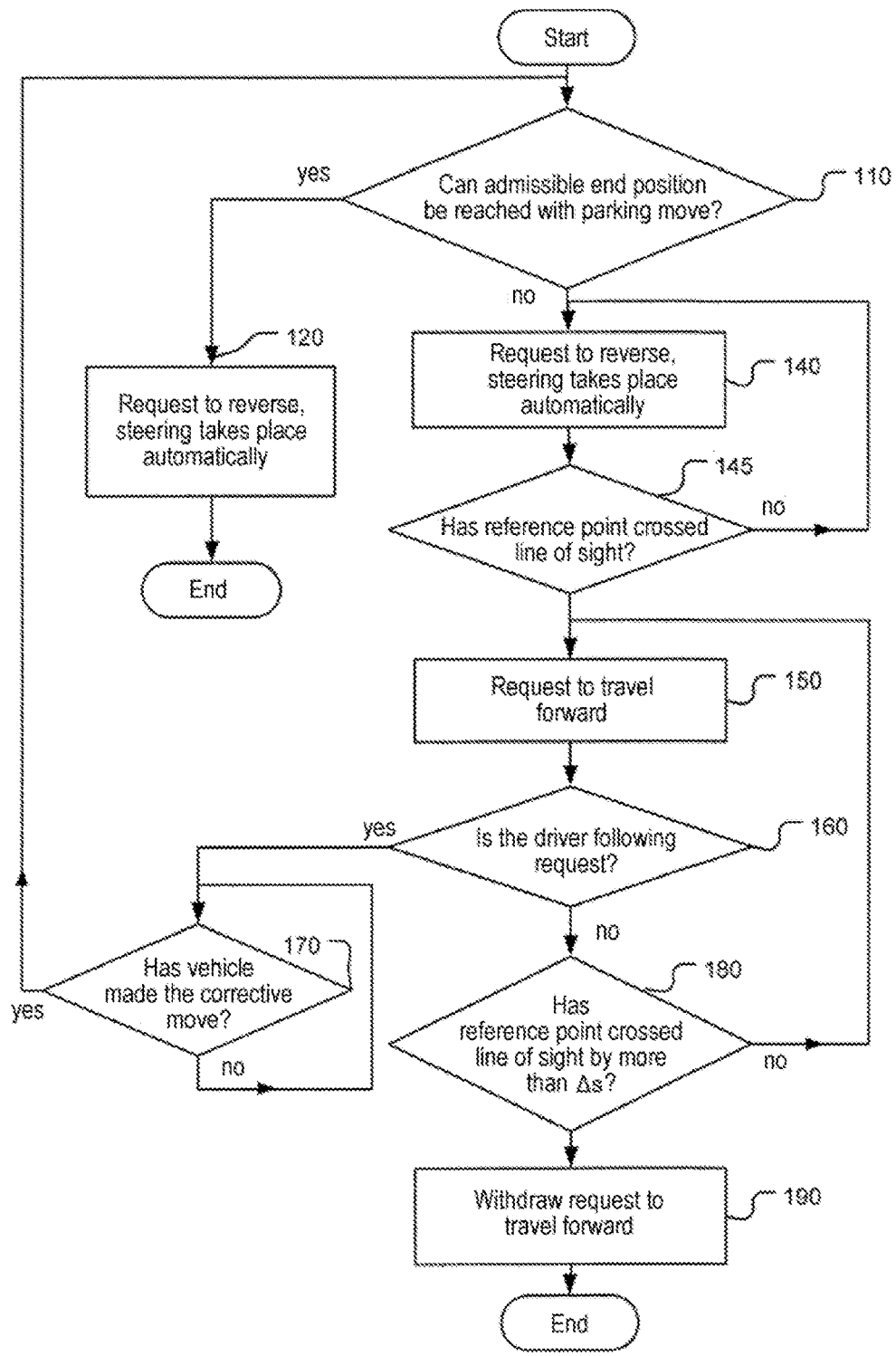
FIG. 2 is an exemplary flowchart for an exemplary method according to the invention.

A check is performed to determine whether the lateral distances and the rotation of the orientation of the ego vehicle satisfy the criteria for an admissible end position, and hence an admissible end position can be reached with the planned parking move in a reverse direction (i.e. there is then no need for a corrective move). This check corresponds to the test 110 in the flowchart depicted in FIG. 2.

If the criteria for an admissible end position are satisfied and hence an admissible end position can be reached with the next parking move in a reverse direction (see "yes" alternative in FIG. 2), then no corrective moves in a forward direction are necessary and the parking maneuver can be performed in a single reverse move. In this case, the driver receives from the parking system the notification to move the vehicle backward (see step 120 in FIG. 2); steering of the vehicle is controlled automatically by the parking assistance system in this case. Shortly before the parking end position is reached, the driver receives the notification to stop the vehicle. After the vehicle is stopped, the parking maneuver is then at an end.

If the criteria for an admissible end position are not satisfied and hence an admissible end position cannot be reached with the next parking move in a reverse direction (see "no" alternative in FIG. 2), then one or more corrective moves in a forward direction are necessary in order to finally reach an admissible parking end position. In this case, it is thus a multimove parking maneuver with at least one corrective move forward. FIG. 1 depicts an exemplary parking trajectory 5 for a multimove parking maneuver with a first parking move in a reverse direction, a subsequent corrective move in a forward direction and a subsequent final parking move in a reverse direction. The reference point for the trajectory 5 is the center of the rear axle, for example.

If the criteria for an admissible end position cannot be satisfied with the first parking move and there is a need for one or more corrective moves in a forward direction, then continual monitoring is activated that continually monitors whether a reference point 7 on the vehicle 4 has crossed a line of sight 8 (see the test 145). The line of sight 8 is formed by the rear or front, facing the road 6, of the two vehicles 2, 3 bounding the perpendicular parking space 1 (in this regard see the line of sight 8 in FIG. 1). By way of example, the line of sight 8 corresponds to the line through the centers of the rear and front of the two vehicles 2, 3. The reference point 7 corresponds to the center of the connecting line between the two B pillars 9 of the ego vehicle 4, for example.

In step 140, the parking move is performed while continually monitoring whether the reference point 7 has crossed the line of sight 8 (see test 145). During the parking move, the driver receives from the parking assistance system, by means of a display device in the vehicle cockpit, the request to reverse; steering is controlled by the parking assistance system.

Figure 3:
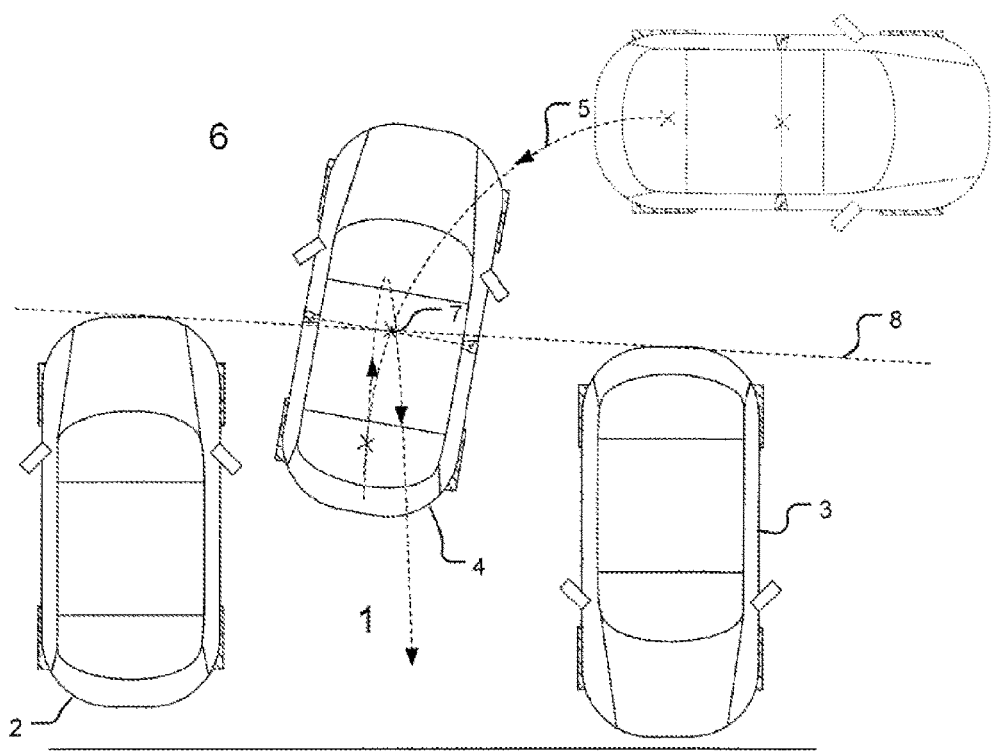
FIG. 3 is a schematic diagram of the parking situation at the time when the reference point on the vehicle crosses the line of sight.

If, during the reverse parking move, it is established that the reference point 7 has crossed the line of sight 8 (see test 145), then premature termination of the parking move and a corrective move in a forward direction are caused by virtue of the driver being asked to travel forward (see step 150). FIG. 3 depicts the time when the reference point 7 is crossing the line of sight 8.

If the driver heeds this request to travel forward (see test 160), then the trajectory is adjusted and, in the test 170, a check is then performed to determine whether the vehicle has made the corrective move with automatic steering completely in a forward direction. If this is the case, then a check is again performed (see test 110) to determine whether an admissible parking end position can be reached with a next parking move in the reverse direction, as has been discussed above in connection with the first parking move. If it is possible, then the driver is asked to reverse, with steering during reversing being controlled automatically; monitoring according to the test 145 to determine whether the reference point has crossed the line of sight is no longer active in this case. Otherwise, reversing is effected while continually monitoring whether the reference point 7 has crossed the line of sight 8.

If, on the other hand, it is established in the test 160 that the driver does not terminate reversing, then the vehicle 4 enters the perpendicular parking space 1 to such a depth that subsequently the driver would no longer have a clear view of the following flowing traffic at the beginning of the subsequent forward move on account of the visual obstruction by the vehicle 2.

To prevent a corrective move in a forward direction in such a situation, a check is now continually performed to determine whether the reference point 7 has crossed the line of sight 8 by more than a prescribed distance Δs (e.g. Δs=40 cm) (see test 180). If this is not yet the case, then the request to travel forward continues to be maintained. The distance Δs corresponds in this case to an additional distance along the trajectory traveled, for example, after the line of sight 8 has been crossed.

Figure 4:
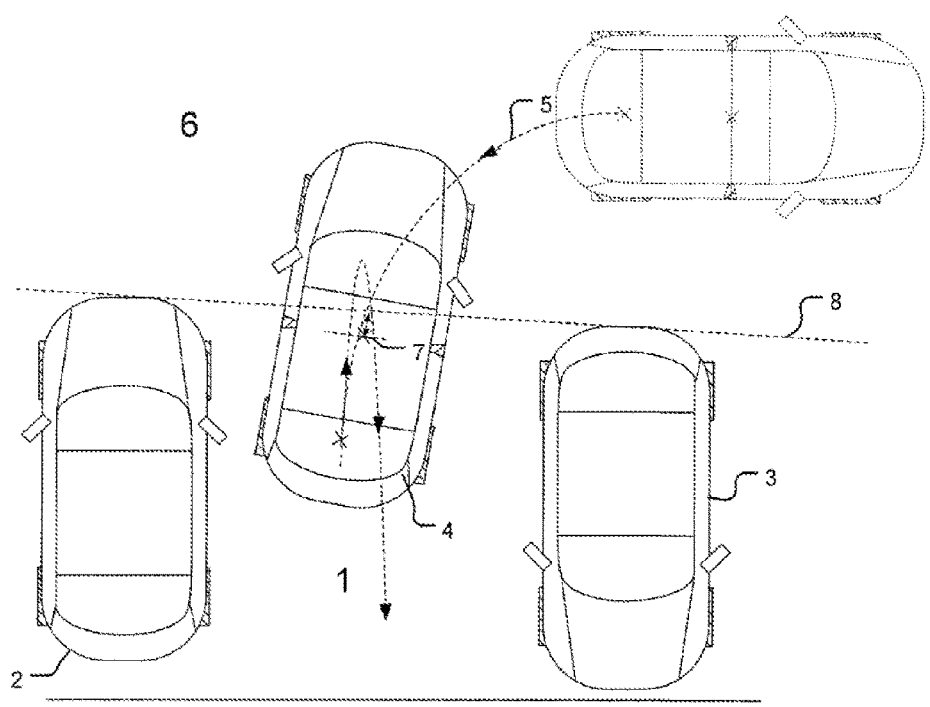
FIG. 4 is a schematic diagram of the parking situation at the time when the reference point on the vehicle crosses the line of sight by a distance $\Delta s$.

FIG. 4 depicts the situation when the reference point 7 is crossing the line of sight 8 by the prescribed distance Δs.

If the reference point 7 has crossed the line of sight 8 by the prescribed distance Δs, then a corrective move in a forward direction needs to be prevented, even though an admissible parking end position cannot be reached with the reverse move made at present. For this reason, the previous request to travel forward is then withdrawn (see step 190) by virtue of the request to travel forward no longer being displayed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for avoiding accidents with following traffic during an automated parking procedure into a perpendicular parking space for a motor vehicle equipped with a parking assistance system having at least automatic lateral guidance, wherein the parking procedure comprises a parking move into the perpendicular parking space in a reverse or forward direction and, when required, subsequently at least one corrective move in a forward or reverse direction, the method comprising the steps of:

determining a need for a corrective move in a forward or reverse direction; and in response thereto, preventing the vehicle from entering the perpendicular parking space to a such depth during the parking move that the driver would subsequently, at a beginning of the corrective move in a forward or reverse direction, no longer have a clear view of the following traffic on account of a visual obstruction by a vehicle bounding the perpendicular parking space.

2. The method as claimed in claim 1, wherein the step of determining the need for the corrective move in a forward or reverse direction comprises the steps of:

prior to the parking move, determining a trajectory of travel for the parking move with a particular parking end position at the end of the trajectory of travel of the parking move; and rating the parking end position in relation to one or more criteria for an admissible parking end position being satisfied and finding that at least one criterion necessary for an admissible parking end position is not satisfied.

3. The method as claimed in claim 1, wherein the step of preventing comprises the step of:

causing termination of the parking move in a reverse direction before the position of the driver crosses the line of sight.

4. The method as claimed in claim 1, wherein the step of preventing comprises the steps of:

while the parking move is taking place, monitoring to what depth the vehicle has already entered the parking space; and in response to determining that the vehicle has already entered the parking space to a particular first limit or beyond a particular first limit, causing premature termination of the parking move and performance of a corrective move in a forward or reverse direction.

5. The method as claimed in claim 4, wherein the parking assistance system is a parking assistance system having automatic lateral guidance, but without automatic longitudinal guidance with automatic drive control and automatic control of direction-of-travel changes, and the step of causing premature termination of the parking move and performance of a corrective move comprises: asking the driver to travel forward or to reverse.

6. The method as claimed in claim 4, wherein the parking assistance system is a parking assistance system having automatic lateral guidance and automatic longitudinal guidance with automatic drive control and automatic control of direction-of-travel changes, and the step of causing premature termination of the parking move and performance of a corrective move comprises: automatically triggering a change of direction of travel and automatically performing the corrective move.

7. A method for avoiding accidents with following traffic during an automated parking procedure into a perpendicular parking space for a motor vehicle equipped with a parking assistance system having at least automatic lateral guidance, wherein the parking procedure comprises a parking move into the perpendicular parking space in a reverse or forward direction and, when required, subsequently at least one corrective move in a forward or reverse direction, the method comprising the steps of:

monitoring to what depth the vehicle has already entered the parking space; and in response to a determination that the vehicle has already entered the parking space to a particular second limit or beyond a particular second limit, preventing a corrective move in a forward or reverse direction despite a need for the corrective move.

8. The method as claimed in claim 7, wherein the parking assistance system is a parking assistance system having automatic lateral guidance, but without automatic longitudinal guidance with automatic drive control and automatic control of direction-of-travel changes, and the step of preventing a corrective move comprises: preventing the driver from being asked to travel forward or to reverse.

9. The method as claimed in claim 8, wherein the second limit is situated deeper in the parking space than a first limit, in response to determining that the vehicle has already entered the parking space to a particular first limit or beyond a particular first limit, the driver is asked to travel forward or to reverse, subsequently, in response to the finding that the vehicle has already entered the parking space to a particular second limit or beyond a particular second limit during the parking move, the request to the driver to travel forward or to reverse is withdrawn.

10. The method as claimed in claim 5, wherein a second limit is situated deeper in the parking space than the first limit, in response to determining that the vehicle has already entered the parking space to a particular first limit or beyond a particular first limit, the driver is asked to travel forward or to reverse, subsequently, in response to the finding that the vehicle has already entered the parking space to a particular second limit or beyond a particular second limit during the parking move, the request to the driver to travel forward or to reverse is withdrawn.

11. The method as claimed in claim 9, wherein following withdrawal of the request to the driver to travel forward or to reverse, the parking assistance function is aborted, optionally with an error notification to the driver, on travel in a forward direction or reverse direction.

12. The method as claimed in claim 10, wherein following withdrawal of the request to the driver to travel forward or to reverse, the parking assistance function is aborted, optionally with an error notification to the driver, on travel in a forward direction or reverse direction.

13. The method as claimed in claim 4, wherein the parking procedure is effected from a traffic area into the perpendicular parking space, and the vehicle has entered the perpendicular parking space to a particular limit or beyond a particular limit when a reference point on the vehicle reaches or crosses a line of sight or reaches or crosses the line of sight with a particular offset, the line of sight being formed by a rear or front, respectively facing the traffic area, of one or more vehicles bounding the perpendicular parking space.

14. The method as claimed in claim 7, wherein the parking procedure is effected from a traffic area into the perpendicular parking space, and the vehicle has entered the perpendicular parking space to a particular limit or beyond a particular limit when a reference point on the vehicle reaches or crosses a line of sight or reaches or crosses the line of sight with a particular offset, the line of sight being formed by a rear or front, respectively facing the traffic area, of one or more vehicles bounding the perpendicular parking space.

15. The method as claimed in claim 9, wherein
the parking procedure is effected from a traffic area into the perpendicular parking space, and
the vehicle has entered the perpendicular parking space to a particular limit or beyond a particular limit when a reference point on the vehicle reaches or crosses a line of sight or reaches or crosses the line of sight with a particular offset, the line of sight being formed by a rear or front, respectively facing the traffic area, of one or more vehicles bounding the perpendicular parking space.

16. The method as claimed in claim 10, wherein
the parking procedure is effected from a traffic area into the perpendicular parking space, and
the vehicle has entered the perpendicular parking space to a particular limit or beyond a particular limit when a reference point on the vehicle reaches or crosses a line of sight or reaches or crosses the line of sight with a particular offset, the line of sight being formed by a rear or front, respectively facing the traffic area, of one or more vehicles bounding the perpendicular parking space.

17. The method as claimed in claim 13, wherein the parking vehicle comprises a B pillar on each vehicle side and the reference point is situated between the two B pillars.

18. The method as claimed in claim 14, wherein the parking vehicle comprises a B pillar on each vehicle side and the reference point is situated between the two B pillars.

19. A parking assistance system for a motor vehicle having at least automatic lateral guidance for performing an automated parking procedure into a perpendicular parking space, wherein the parking procedure comprises a parking move into the perpendicular parking space in a reverse or forward direction and, when required, subsequently at least one corrective move in a forward or reverse direction, wherein the parking assistance system is configured to avoid accidents with following traffic by executing processing to:
  determine a need for a corrective move in a forward or reverse direction, and
  in response thereto, prevent the vehicle from entering the perpendicular parking space to such a depth during the parking move that the driver would subsequently, at the beginning of the corrective move in a forward or reverse direction, no longer have a clear view of the following traffic on account of visual obstruction by a vehicle bounding the perpendicular parking space.

20. A parking assistance system for a motor vehicle having at least automatic lateral guidance for performing an automated parking procedure into a perpendicular parking space, wherein the parking procedure comprises a parking move into the perpendicular parking space in a reverse or forward direction and, when required, subsequently at least one corrective move in a forward or reverse direction, wherein the parking assistance system is configured to avoid accidents with the following traffic by executing processing to:
  monitor to what depth the vehicle has entered the parking space, and determine that the vehicle has already entered the parking space to a particular second limit or beyond a particular second limit, and
  in response to this determination, preventing a corrective move in a forward or reverse direction despite a need for the corrective move.

* * * * *